UNITED STATES PATENT OFFICE.

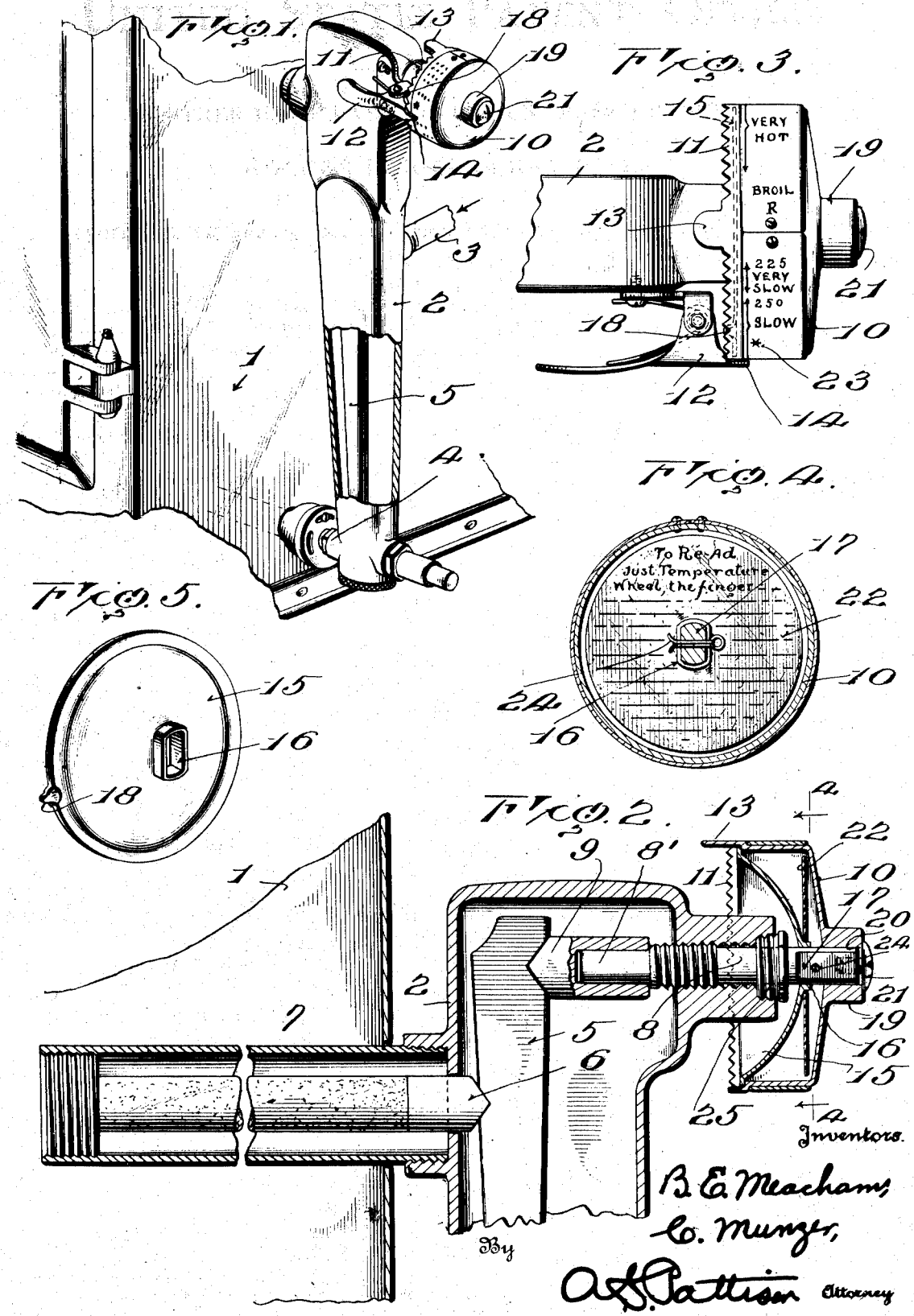

BENJAMIN E. MEACHAM, OF LORAIN, OHIO, AND CHARLES MUNZNER, OF CHICAGO, ILLINOIS, ASSIGNORS TO AMERICAN STOVE COMPANY, OF ST. LOUIS, MISSOURI, A CORPORATION OF NEW JERSEY.

THERMOSTAT FUEL-REGULATING DEVICE FOR GAS-STOVES.

1,396,706.   Specification of Letters Patent.   Patented Nov. 8, 1921.

Application filed October 2, 1920. Serial No. 414,333.

*To all whom it may concern:*

Be it known that we, BENJAMIN E. MEACHAM, of Lorain, in the county of Lorain and State of Ohio, and CHARLES MUNZNER, of Chicago, in the county of Cook and State of Illinois, citizens of the United States, have invented new and useful Improvements in Thermostat Fuel-Regulating Devices for Gas-Stoves, of which the following is a specification, reference being had herein to the accompanying drawings.

This invention relates to improvements in thermostat fuel regulating devices for gas ovens, and pertains to a construction adapted to keep a baking oven at a predetermined regulated temperature, according to the heat requirements of the different articles being baked, such, for instance, as exemplified in the patent to B. E. Meacham, No. 1,236,335, dated August 7th, 1917.

In this type of regulator, which involves a regulating screw-threaded shaft and a temperature indicating wheel attached to the regulating shaft for controlling and indicating the temperature of the oven, any slip of the indicator wheel on the shaft throws the regulator out of proper adjustment, so that it no longer properly indicates to the user the oven temperature.

One object of the present improvement is to provide means to prevent the slipping of the indicator wheel relative to the adjusting shaft, so that when the wheel is once set in respect to the shaft their relative positions cannot be changed by any slipping of the wheel in respect to its shaft.

A further object of the present improvement is to provide a simple and effective way for one who is not familiar with the device to readjust the regulator when, for any reason, the oven temperature does not correspond with the markings on the indicator wheel, which will avoid the necessity of the services of an expert for that purpose.

A further object of the present invention is to provide a construction whereby the indicator wheel can be properly positioned in respect to the adjusting shaft, should it be necessary for any reason to remove the wheel therefrom.

A further object of the present invention is to position within the indicator wheel an adjustment directions disk whereby when the indicator wheel is removed, the directions on the disk will enable one unskilled to properly replace the indicator wheel or to adjust it for higher or lower temperature to make the markings on the indicator wheel correspond with the oven temperature.

In the accompanying drawings:

Figure 1 shows the present improvement applied to an oven.

Fig. 2 is an enlarged vertical central section through the upper end of the regulator and showing our present improvements applied thereto.

Fig. 3 is a top plan view of the indicator wheel and its coöperating parts.

Fig. 4 is a transverse sectional view on the line 4—4 of Fig. 2, looking in the direction indicated by arrow.

Fig. 5 is a detached perspective view of the indicator wheel locking member or disk.

In the accompanying drawings, 1 indicates a portion of a baking oven, and 2 a housing located outside of the oven. A gas-supply pipe 3 communicates with this housing and the lower end of the housing has an outlet nipple 4, which communicates with a burner (not shown) for heating the oven 1. A lever 5 is within the housing 2 and has its inner edge in engagement with the outer end 6 of a suitable thermostat 7, which extends into the oven 1. A screw-threaded regulating shaft 8 passes through the upper end of the housing 2 and has its inner end either in direct engagement with the upper outer edge of the lever 5, as shown in the aforesaid patent, or in operative engagement therewith, through an intervening member 9, as here shown. The shaft 8 extends through the housing and carries an indicator wheel 10, which wheel is approximately cup-shape in cross section. The inner edge of this indicator wheel 10 is provided with a series of notches 11, which are engaged by a suitable spring latch 12, for holding the indicator wheel to its adjusted position. Thus far the parts described do not differ from those disclosed in the aforesaid patent.

The indicator wheel, here shown, also has at its inner edge a stop finger 13, like that shown and described in the Meacham Patent No. 1,285,300, and for the same purpose. In these mentioned patents, the indicator wheel is fastened to its shaft by a set screw. It is found in practice that in the hands of the ordinary user the indicator wheel sometimes slips on its shaft and thereby changes the relative positions of the wheel and its shaft and destroys their proper adjustment so that the indicator will no longer properly indicate the oven temperature. As explained in the herein mentioned patents, the flow of gas to the burner (not here shown) is controlled by the lower end of the lever 5, acting on a needle valve, as shown and described in the first-mentioned patent but not here shown. This lever 5 is controlled in its movements by the thermostat 7, the arrangement being such that when the oven is cooled there is a full flow of gas to the burner, and as the oven heats up the thermostat acts on the lever 5 and controls the flow of gas to the burner, so that when the oven reaches the temperature indicated on the indicator wheel, the flow of gas is so regulated that the indicated temperature will be maintained within the oven. That is to say, when the indicator wheel is turned so that the desired degree is opposite the pointer 14, the adjustment of the parts is such that the proper flow of gas will pass to the burner to maintain the indicated temperature on the indicator wheel. In this way the desired temperature in the oven can be obtained and maintained simply by setting the temperature of the indicator wheel opposite the pointer.

One of our present improvements is providing a locking disk or member 15, which has at its center an angular opening 16, fitting upon a correspondingly shaped angular end 17, of the shaft 8, whereby this member 15 and the shaft are locked against any relative rotary movement. The locking member 15 is provided at its periphery with a projection 18, adapted to engage the notches 11 of the indicator wheel, whereas the hub 19 of the indicator wheel has a circular opening 20, which permits the indicator wheel to be freely turned on the shaft, to cause the projection 18 to engage either of the notches 11 of the wheel. A large headed screw 21 engages the outer end of the hub 19 and screws into the end of the shaft 8. By this construction, the indicator wheel is locked to the shaft through the medium of the locking member 15, so that there can be no relative slipping rotary movement of the wheel in respect to its shaft, except by intentional turning outward on the screw 21 sufficiently to permit the disengagement of the projection 18 with the notches 11 of the wheel.

A direction disk 22 is located between the indicator wheel 10 and the locking disk or member 15. The periphery of the indicator wheel 10 is provided with a setting mark or * 23, the object and function of which will be presently stated. A cotter-pin 24 passes through the angular portions 17 of the shaft 8, and serves to hold the locking member 15 and the direction disk 22 in position on the shaft.

If because of the character of the gas, or for any other reason, the temperature of the oven does not correspond with the indicated temperature on the wheel, it can be readily adjusted by an unskilled person so that the temperature of the wheel at the pointer 14 will correspond with the temperature of the oven by following the simple directions on the indicator disk 22. This adjustment is accomplished by loosening the screw 21 sufficient to permit the indicator wheel to slide outward on the shaft 8 sufficient to disengage the notches 11 with the projection 18 of the locking member 15, then as stated, on the direction disk, by causing the projection to engage one notch to the right of the * on the wheel, a ten degrees lower temperature will be obtained, and by setting the projection 18 in the notch to the left of the *, a higher temperature is obtained in the oven. As this adjustment does not change any of the indicated temperatures on the wheel, a regulation made in this way for one temperature makes it correct for the other indicated temperatures.

By means of this construction, an unskilled person can remove the indicator wheel, the locking member 15 and the direction disk 22, for the purpose of packing the stuffing box 25 around the shaft 8, or for any other purpose and put the parts back in their proper relative position by simply observing the relative position of the projection 18 to the * 23, and put the parts back in their original relative positions.

We do not limit our invention to the exact construction here shown, because variations can be made by skilled persons which involves the inventive novelty without departing from the spirit and scope of the appended claims.

Having thus described our invention, what we claim and desire to secure by Letters Patent is:—

1. A thermostatic control, comprising a regulating shaft, an indicator wheel movable thereon, a locking member carried by the shaft and held against relative rotation thereon, the indicator wheel and the locking member interlocking, and means for holding the wheel and locking member in interlocking positions, for the purpose described.

2. A thermostatic control, comprising a regulating shaft, a locking member carried by the shaft and held against relative rotation thereon, an indicator wheel rotatable and longitudinally movable on the shaft, the wheel and locking member having respectively a projection and a plurality of notches for locking engagement, and means for holding the wheel and locking member in locking positions.

3. A thermostatic control, comprising a regulating shaft, a locking member carried by the shaft and held against relative rotation thereon, the locking member having a locking projection, an indicator wheel rotatable and longitudinally movable on the shaft, the wheel having a plurality of notches adapted to respectively engage the locking member projection, and means for holding the wheel with the projection in one of said notches, for the purpose described.

4. A thermostatic control, comprising a regulating shaft, a locking disk carried by the shaft and held against relative rotation thereon, the disk having at its periphery a locking projection, a cup-shaped indicator wheel having at its inner edge a plurality of notches adapted to respectively engage the locking projection, the disk longitudinally and rotatably movable in respect to the shaft and means for holding the wheel in locking engagement with the locking projection.

5. A thermostatic control, comprising a regulating shaft, a locking member locked to the shaft, an indicator wheel rotatably and longitudinally movable in respect to the shaft, the wheel and locking member interlocking at various points, and means for holding the wheel and disk in locking engagement.

6. A thermostatic control, comprising a regulating shaft, an indicator member rotatably adjustable on the shaft, a locking member locked to the shaft, the locking member and indicator member being relatively movable for engagement and disengagement thereby permitting relatively rotary adjustment of the parts, for the purpose described.

7. A thermostatic control, comprising a regulating shaft, an indicator member, a locking member and one of said members being locked to the shaft and the other rotatable in respect to the shaft, said indicating member and locking member having relative lateral movements for locking and interlocking with each other, and means for holding the parts in their locked positions.

8. A thermostatic control, comprising a regulating shaft, an indicator wheel and locking member carried by the shaft, the locking member locked to the shaft, and the indicator member loose on the shaft, the indicating member and locking member interlocking with each other, the indicating member having a setting mark at a predetermined point in respect to the locking member, for the purpose described.

9. A thermostatic control, comprising a regulator shaft and a locking member, the locking member locked to the shaft and the indicator member loose on the shaft, the locking member having a projection at its periphery to engage the indicator member, the indicator member having a setting member positioned in respect to the projection of the locking member, for the purpose described.

10. A thermostatic control, comprising a regulating shaft, a locking member fixed to the shaft, an indicator wheel, the locking member and indicator wheel interlocking, the indicator wheel having a setting mark, and a direction disk between the indicator wheel and the locking member, whereby when the indicator wheel is removed, the direction disk enables the user to properly reset or regulate the parts, for the purpose described.

11. A thermostatic control, comprising a regulating shaft, a locking member locked to the shaft, an indicator wheel loose on the shaft, the parts having relatively a locking member and a setting mark, and a direction disk between the indicator wheel and locking member, for the purpose described.

12. A thermostatic control, comprising a regulating shaft, a cup-shaped indicator wheel loose on the shaft, a locking disk locked to the shaft and fitting in the opening in the indicator wheel, the locking disk and wheel interlocking, and a direction disk within the wheel, for the purpose described.

In testimony whereof, we hereunto affix our signatures.

BENJAMIN E. MEACHAM.
CHARLES MUNZNER.